(12) United States Patent
Shaw (10) Patent No.: US 11,519,248 B2
(45) Date of Patent: Dec. 6, 2022

(54) SELECTIVELY INJECTABLE TRACER FLOWMETER

(71) Applicant: Silverwell Technology Ltd., Histon (GB)

(72) Inventor: Joel David Shaw, Houston, TX (US)

(73) Assignee: SILVERWELL TECHNOLOGY LTD., Cambridgeshire (GB)

( * ) Notice: Subject to any disclaimer, the term of this patent is extended or adjusted under 35 U.S.C. 154(b) by 23 days.

(21) Appl. No.: 16/861,167

(22) Filed: Apr. 28, 2020

(65) Prior Publication Data

US 2021/0332695 A1   Oct. 28, 2021

(51) Int. Cl.
| | | |
|---|---|---|
| *E21B 43/12* | (2006.01) | |
| *E21B 47/11* | (2012.01) | |
| *E21B 34/06* | (2006.01) | |
| *E21B 49/08* | (2006.01) | |
| *G01F 1/708* | (2022.01) | |

(52) U.S. Cl.
CPC .......... *E21B 43/122* (2013.01); *E21B 34/06* (2013.01); *E21B 47/11* (2020.05); *E21B 49/08* (2013.01); *G01F 1/708* (2013.01)

(58) Field of Classification Search
CPC .......... E21B 47/11; E21B 49/08; E21B 34/06; E21B 43/122; G01F 1/708
See application file for complete search history.

(56) References Cited

U.S. PATENT DOCUMENTS

| | | | | |
|---|---|---|---|---|
| 4,972,704 A | * | 11/1990 | Wellington | ........... E21B 49/087 73/152.18 |
| 5,031,697 A | * | 7/1991 | Wellington | ........... E21B 43/122 166/250.12 |
| 5,047,632 A | * | 9/1991 | Hunt | ..................... G01F 1/7042 250/302 |
| 5,063,772 A | * | 11/1991 | Wellington | ............. G01M 3/22 73/40.7 |
| 5,182,939 A | | 2/1993 | Chien et al. | |
| 5,881,807 A | | 3/1999 | Boe et al. | |
| 6,131,451 A | | 10/2000 | Izbicki et al. | |
| 6,633,236 B2 | * | 10/2003 | Vinegar | .................. E21B 43/14 340/854.3 |
| 6,645,769 B2 | | 11/2003 | Tayebi et al. | |
| 6,840,316 B2 | | 1/2005 | Stegemeier et al. | |

(Continued)

FOREIGN PATENT DOCUMENTS

| | | |
|---|---|---|
| EP | 3553274 A1 | 10/2019 |
| WO | 2019235936 A1 | 12/2019 |

OTHER PUBLICATIONS

International Search Report and Written Opinion of PCT Application No. PCT/GB2021/051018 (STL026) dated Jul. 29, 2021: pp. 1-15.

*Primary Examiner* — Nicole Coy (74) *Attorney, Agent, or Firm* — Bracewell LLP; Constance G. Rhebergen; Keith R. Derrington (57) ABSTRACT

Gas and liquid velocities of fluid in a lift gas assisted well system are estimated by adding liquid and gas tracers downhole and monitoring their travel time over a known distance. Based on estimated velocities, a slip factor is obtained that represents relative velocities of the gas and liquid in the fluid. A flow regime of the fluid is identified based on the slip factor. The flow regime is optionally altered by adjusting one or more operational parameters of the well.

15 Claims, 8 Drawing Sheets

(56) References Cited

U.S. PATENT DOCUMENTS

| | | | |
|---|---|---|---|
| 8,150,637 B2* | 4/2012 | Peacock | E21B 43/122 |
| | | | 702/47 |
| 10,030,508 B2* | 7/2018 | Romer | E21B 43/168 |
| 10,151,198 B2* | 12/2018 | Sira | E21B 49/087 |
| 10,260,334 B2* | 4/2019 | Peacock | E21B 47/07 |
| 10,865,637 B2* | 12/2020 | Kulyakhtin | E21B 43/14 |
| 2017/0183955 A1 | 6/2017 | Peacock et al. | |
| 2019/0203587 A1 | 7/2019 | Kulyakhtin et al. | |
| 2020/0032641 A1* | 1/2020 | Kulyakhtin | E21B 47/11 |
| 2021/0079770 A1* | 3/2021 | Watson | E21B 43/122 |

* cited by examiner

SELECTIVELY INJECTABLE TRACER FLOWMETER

BACKGROUND OF THE INVENTION

1. Field of Invention

The present disclosure relates to estimating two-phase flow in a well that is assisted by lift gas. More specifically, the present disclosure relates to monitoring the travel of tracer fluid that is injected into fluid being produced in the well.

2. Description of Prior Art

Hydrocarbon producing wells are drilled into subterranean formations having hydrocarbons trapped within, these wells generally include production tubing for conveying produced fluids from the formation to surface. The produced fluids typically include one or more of liquid hydrocarbons, gas hydrocarbons, and water. Some of these formations have insufficient pressure to lift the liquids to surface, and lift assistance is sometimes installed in the well. Gas lift systems are one type of lift assistance, and generally operate by injecting amounts of lift gas downhole and into a stream of produced fluid flowing in the production tubing. The gas becomes dispersed within the stream of flowing fluid to give the fluid enough buoyancy to flow to surface on its own accord. The lift gas is sometimes obtained from surrounding wells, and commonly introduced into an annulus in the well formed between the production tubing and surrounding casing. Typically the lift gas enters the production tubing through injection valves that are disposed downhole in the annulus, and usually mounted onto an outer surface of the production tubing. Some injection valves operate based on a set pressure in the annulus or tubing, and others are equipped with electro-mechanical or hydraulic actuators that are controlled remotely.

Reliable values of well fluid production flowrates are necessary for evaluating reserves to estimate future production. Flowrates also are useful for balancing and/or optimizing well production, and can indicate if there are problems in the well. Flowrates from a particular well are also sometimes analyzed for assessing an entire reservoir. Flowrates are also sometimes necessary to determine production fluid contribution and affect its accounting. However, it can be difficult to obtain accurate flowrates when assisting well production by lift gas injection due to the two-phase flows resulting from addition of the lift gas.

SUMMARY OF THE INVENTION

Disclosed herein is an example method of operating a well by injecting lift gas into a stream of production produced fluid flowing inside the well, adding a tracer liquid into the stream at a first location so that the tracer liquid flows downstream with the production fluid, adding a tracer gas into the stream at a second location so that the tracer gas flows downstream with the production fluid, sensing the presence of the tracer liquid in the stream at a third location that is downstream of the first location, sensing the presence of the tracer gas in the stream at a fourth location that is downstream of the second location, estimating a velocity of the tracer liquid flowing in the stream based on a time span between adding and sensing the tracer liquid and a distance between the first and third locations, estimating a velocity of the tracer gas flowing in the stream based on a time span between adding and sensing the tracer gas and a distance between the first and third locations, obtaining an estimated slip factor of a liquid and a gas flowing in the production stream that is based on estimated velocities of tracer liquid and tracer gas, and identifying a characteristic of the stream of production fluid based on the estimated slip factor. A characteristic of the stream of production fluid includes a flow regime. The method further optionally includes altering the flow regime by adjusting an amount of lift gas being injected into the stream of production fluid, or alternatively changing a location(s) of where lift gas is being injected. In an alternative the production stream flows through a string of production tubing inside the well, and injecting the tracer liquid involves collecting an amount of the tracer liquid in an annulus that circumscribes the production tubing and adjacent a tracer liquid injection module, and selectively opening a valve in the tracer liquid injection module to provide communication between the annulus and inside of the production tubing. The production stream alternatively flows through a string of production tubing inside the well, and injecting the tracer gas involves injecting the tracer gas into an annulus that circumscribes the production tubing and adjacent a tracer gas injection module, and selectively opening a valve in the tracer gas injection module to provide communication between the annulus and inside of the production tubing. Adding the tracer liquid in some instances includes introducing a selected amount of the tracer liquid to form a tracer liquid assemblage in the stream. In an example, the production stream flows through a string of production tubing inside the well, and injecting the tracer liquid optionally includes introducing amounts of the tracer liquid and the tracer gas into an annulus that circumscribes the production tubing, and opening passages in a tracer injection module to selectively inject the tracer liquid and the tracer gas into the production tubing. In an alternative, the tracer injection module includes a first passage for introducing the tracer gas into the stream and a second passage for introducing the tracer liquid into the stream. In an embodiment, the tracer injection module includes a snorkel that is in the annulus and has an opening that is above an interface between tracer gas and tracer liquid in the annulus, and wherein the snorkel comprises a pathway for the tracer gas to flow to the first passage. In an alternative, the stream flows uphole in the well inside a string of production tubing, and wherein the first and third locations are proximate a lower end of the production tubing, and wherein the third and fourth locations are proximate a wellhead assembly that is mounted over an opening of the well and on surface.

Another method of wellbore operations is disclosed herein and that includes adding lift gas to a stream of production fluid that is flowing uphole inside of a string of production tubing disposed in the wellbore, adding a tracer liquid into a liquid injection port disposed on a lower end of the production string so that the tracer liquid flows with the production fluid uphole, obtaining a velocity of the tracer liquid by sensing for the presence of the tracer liquid at a location uphole and spaced away from the liquid injection port, and estimating a slip factor between gas and liquid in the production fluid based on the velocity of the tracer liquid. The method further optionally includes identifying a flow regime of the production produced fluid flowing in the production string. In an alternative, the method further involves altering the flow regime of the produced fluid flowing in the production string by adjusting an amount of lift gas added to the stream, or changing a location(s) of where the lift gas is added. A tracer gas is optionally added into the stream through a tracer gas injection point, a velocity of the tracer gas in the stream is obtained by sensing for the tracer gas at a location spaced away from the tracer gas injection point, and wherein the velocity of the tracer gas is used for estimating a slip factor. The tracer gas injection point is alternatively collocated with the tracer liquid injection point. In an embodiment, the tracer gas and tracer liquid are introduced into the production tubing through separate passages within a tracer injection module, and wherein the tracer injection module comprises a snorkel tube that extends from a body of the module past an interface between the tracer gas and tracer liquid in an annulus that circumscribes the production tubing.

Also disclosed is a system for producing fluids from within a wellbore that includes production tubing disposed in the wellbore and defining an annulus between the production tubing and sidewalls of the wellbore, a lift gas system having a source of lift gas and a lift gas line with a discharge end in the annulus that is in selective communication with the source of lift gas, a tracer injection module coupled with the production tubing and that includes a tracer liquid passage that is selectively changeable between open and closed configurations, a tracer gas passage that is selectively changeable between open and closed configurations, and a snorkel that is in communication with the tracer gas passage, a tracer liquid system having a source of tracer liquid and a tracer liquid line with a discharge end in the annulus that is in selective communication with the source of tracer liquid, a tracer gas system having a source of tracer gas and a tracer gas line with a discharge end in the annulus that is in selective communication with the source of tracer gas, and an amount of tracer liquid in the annulus, an amount of tracer gas in the annulus, an interface between the tracer liquid in the annulus and the tracer gas in the annulus that is below an open end of the snorkel. The system further optionally includes a means for estimating a flowrate of a stream of production produced fluid flowing through the production tubing. An example of a tracer gas is carbon dioxide. Examples exist of a stream of production fluid that selectively flows through the production tubing, and in which the tracer liquid and the tracer gas are selectively injected into through the tracer injection module and are carried uphole and sensed by a sensor in the production tubing that is spaced away from the tracer injection module and responsive to the presence of the tracer liquid, the tracer gas, or both.

BRIEF DESCRIPTION OF DRAWINGS

Some of the features and benefits of the present invention having been stated, others will become apparent as the description proceeds when taken in conjunction with the accompanying drawings, in which.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
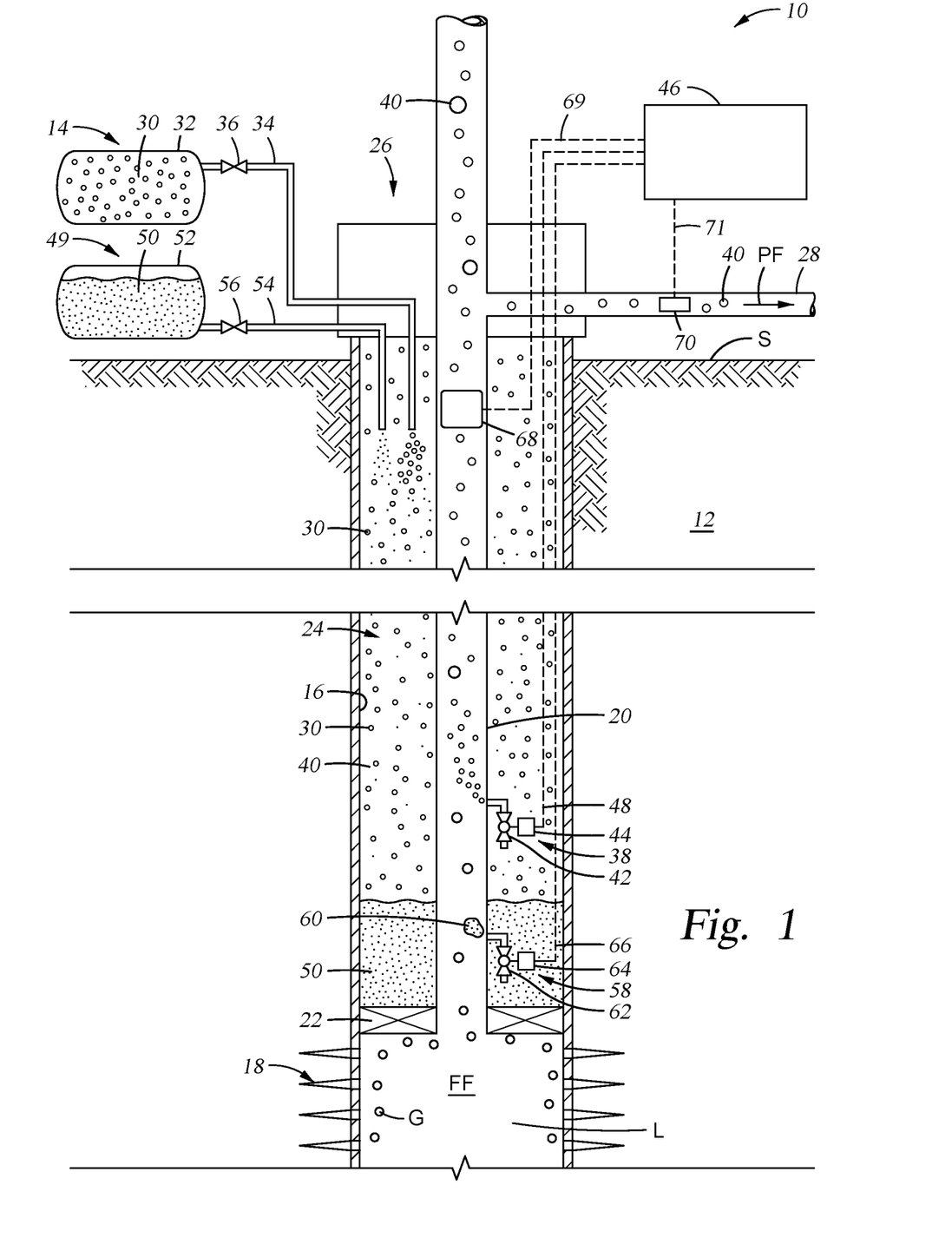
FIG. 1 is a side sectional view of an example of injecting a tracer liquid into a well assisted by lift gas injection.

An example of a well system 10 is shown in a side partial sectional view in FIG. 1, and where the well system 10 is employed for extracting hydrocarbons from within a subterranean formation 12. An example of a lift gas system 14 is shown included with the well system 10 and for assisting with the lift of liquids collected within a wellbore 16 that penetrates formation 12. Perforations 18 are shown that provide a pathway for the hydrocarbons and other fluids to enter into the lower end of wellbore 16. For the purposes of discussion herein, the hydrocarbons and other fluids in the formation 12 are referred to herein as formation fluid FF. As depicted inside wellbore 16 formation fluid FF is made up of liquid L with amounts of gas G dispersed within the liquid L. A string of production tubing 20 is shown inserted within wellbore 16, inside of which the formation fluid FF make its way uphole. A packer 22 is set at lower end of production tubing 20 and blocks the flow of formation fluid FF into an annulus 24 between the production string 20 and sidewalls of wellbore 16. A wellhead assembly 26 is set at an opening of wellbore 16 and on surface S. In this example, wellhead assembly 26 provides pressure control for the well 16, and also is used for distributing produced fluid PF that has exited well 16. A production line 28 is shown having an end attached to wellhead assembly 26, and which is in communication with the production tubing 20. In the example of FIG. 1, within the wellhead assembly 26 produced fluid PF flowing in the production tubing 26 is redirected into the production line 28; which carries the produced fluid PF offsite.

The lift gas system 14 of FIG. 1 injects a lift gas 30 downhole, the lift gas 30 is provided by a lift gas source 32 schematically shown as a container on surface S. Other embodiments of the lift gas source 32 are envisioned and include surrounding wells, pipelines, compressors, tanks, and the like. A lift gas line 34 is included with the example lift gas system 14, and shown having an inlet end attached to the lift gas source 32, and a distal discharge end inserted into the well in annulus 24. In a non-limiting example, lift gas 30 is introduced into annulus 24 by selectively opening and closing a lift gas valve 36 illustrated disposed within lift gas line 34. Depicted in the example of FIG. 1 is an amount of lift gas 32 having been introduced into the well 16 and that substantially occupies the space within annulus 24. A lift gas injection module 38 is shown mounted onto an outer sidewall of production tubing 20 that selectively injects amounts of the lift gas 30 into the production tubing 20 to produce bubbles 40 of lift gas 30 inside the production tubing 20 that are combined with the formation fluid FF to form the produced fluid PF. The produced fluid PF with its added bubbles 40 is a two-phase flow stream with a density less than the formation fluid FF, and which promotes the flow of the produced fluid PF upwards within the well 16 and lifting of the formation fluid FF. In an example, within the two-phase flow stream of produced fluid PF and lift gas 30 upwards within the production tubing 20, the lift gas 30 velocity exceeds formation fluid FF velocity; a ratio of those velocities is referred to as a slip factor or slip ratio. In the embodiment illustrated, the lift gas injection module 38 includes an injection valve 42 that is selectively opened to inject lift gas 30 into production tubing 20. Further included in the example is an actuator 44 shown coupled with injection valve 42 for providing a motive force for actuating valve 42. In an alternative, commands initiating operation of actuator 44 are provided from a controller 46 shown outside of wellbore 16 and that are transmitted by a communication line 48.

Still referring to FIG. 1, an example of a tracer liquid injection system 49 is included with the well system 10 and which is used for selectively providing tracer liquid 50 into the stream of produced fluid PF flowing upwards within the production tubing 20. In this example, tracer liquid 50 is provided by a tracer liquid source 52 which is schematically illustrated as a vessel, alternate embodiments of the tracer liquid source 52 include pipelines, tanks, trucks, and the like. A tracer liquid supply line 54 extends from tracer liquid source 52 and has a discharge end set within annulus 24. Shown integral with tracer liquid supply line 54 is a tracer liquid supply valve 56 that is selectively opened and closed to allow for the discharge of the tracer liquid from the tracer liquid supply source 52 and into annulus 24. In the example shown the tracer liquid 50 has a density higher than the lift gas 30 and when added into the annulus 24 the tracer liquid 50 drops through the lift gas 30 and collects in a lower end of annulus 24, and is shown supported on packer 22. Also included with the example tracer liquid injection system 49 is a tracer liquid injection module 58 shown in the annulus 24 and at a depth between packer 22 and lift gas injection module 38. In an example, amounts of tracer liquid 50 are injected into the production tubing 20 and through tracer liquid injection module 58. In one embodiment, tracer liquid 50 is a liquid with viscous properties so that when amounts are introduced into another liquid the amount of tracer liquid 50 injected forms a tracer liquid assemblage 60, and remains cohesive as it flows upward in the production tubing 20 with the stream of produced fluid PF. In a non-limiting example a designated amount of tracer liquid 50 is added to annulus 24 so that when collected in the annulus 24 and supported on an upper surface of packer 22, an upper level of the tracer liquid 50 is above tracer liquid injection module 58 so that tracer liquid injection module 58 is fully submerged within the tracer liquid 50. In this example operation of tracer liquid injection module 58 is similar to that of the lift gas injection module 38, and includes a tracer liquid injection valve 62 shown coupled with a tracer liquid actuator 64 for opening and closing valve 62. In an alternative, signals for opening and closing the valve 62 are sent to actuator 64 via communication line 66. Similar to communication line 48, communication line 66 connects to controller 46 on surface. In an alternative, lines 48 and 66 connect to one another, and a single line extends to controller 46 above where they connect. Embodiments of the tracer fluid 50 include liquids with characteristics (such as salinity) or components making them detectable by sensors when in a flow of fluid. A tracer liquid sensor 68 is shown coupled with production tubing 20 and at a location distal from where the assemblage 60 is introduced into the production tubing 20. Alternate embodiments have the sensor 68 proximate to the module 58 or within wellhead assembly 26. In this example, sensor 68 is in communication with controller 46 via a communication link 69, an embodiment of which is like the other communication lines disclosed herein is hard-wired, fiber optic, and/or wireless. Further optionally, an additional tracer liquid sensor 70 is shown downstream and within the production line 28 and that is in communication with the controller via communication link 71.

Figure 2:
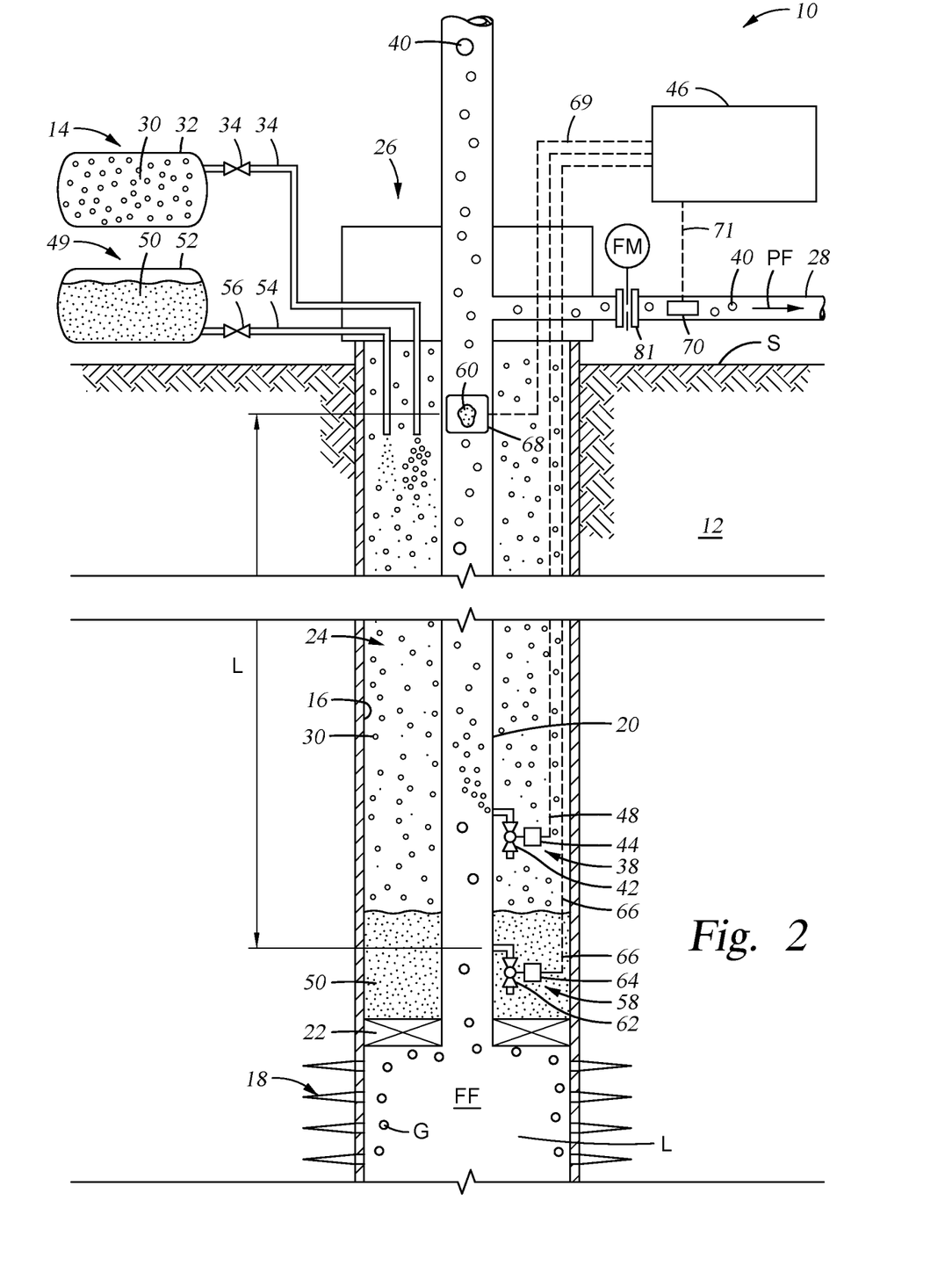
FIG. 2 is a side sectional view of the well of FIG. 1 at a period of time after the tracer liquid was injected.

Referring now to FIG. 2, tracer assemblage 60 is shown within production tubing 20 and adjacent the sensor 68. Further shown in the example of FIG. 2, is a wing valve 80 in the production line 28, and a flow meter 81 also within the production line 28. In an embodiment, wing valve 80 is throttled to control a flow rate in production line 28 and/or pressure in production string 20; and alternatively, flow meter 81 is monitored for estimating a flow rate of the total flow of produced fluid PF flowing through the production line 28 and which is selectively monitored for obtaining a flow rate of produced fluid PF flowing through production tubing 20. In a non-limiting example of operation, a time is recorded when the tracer liquid assemblage 60 is introduced into the production string 20, and a time is recorded when the assemblage 60 is sensed by sensor 68, which is referred to herein as a travel time for the liquid assemblage 60 in the production tubing 20 between the tracer liquid injection module 58 and sensor 68. In an alternative, the time when the assemblage 60 is introduced into the production string 20 is set to when the injection module 58 is actuated to open valve 62. Based on the travel time and length L of travel distance in the production tubing 20 between the tracer liquid injection model 58 and the sensor 68, a velocity is estimated of the liquid assemblage 60 when traveling along the length L. In an example, a density of the tracer liquid assemblage 60 is approximate to that of the liquid L flowing in the produced fluid PF; the example assumes that the tracer liquid assemblage 60 travels at substantially the same rate as the liquid L within the produced fluid PF. As noted above, an estimate of total flow of produced fluid PF flowing uphole is obtainable by monitoring output from flow meter 81. Further in this example, a velocity of the bubbles 40 of the lift gas 30 flowing within production tubing 20 is estimated by monitoring a time when lift gas 30 is injected into production tubing 20 (alternatively concurrent with opening of invention valve 42), and when a corresponding increase in the flow rate of produced fluid PF is sensed by flow meter 81. Based upon these respective estimated velocities of the bubbles 40 of lift gas 30 and liquid L, a slip factor is established and deemed to represent a slip factor between liquid L and gas within the produced fluid PF.

Figure 3:
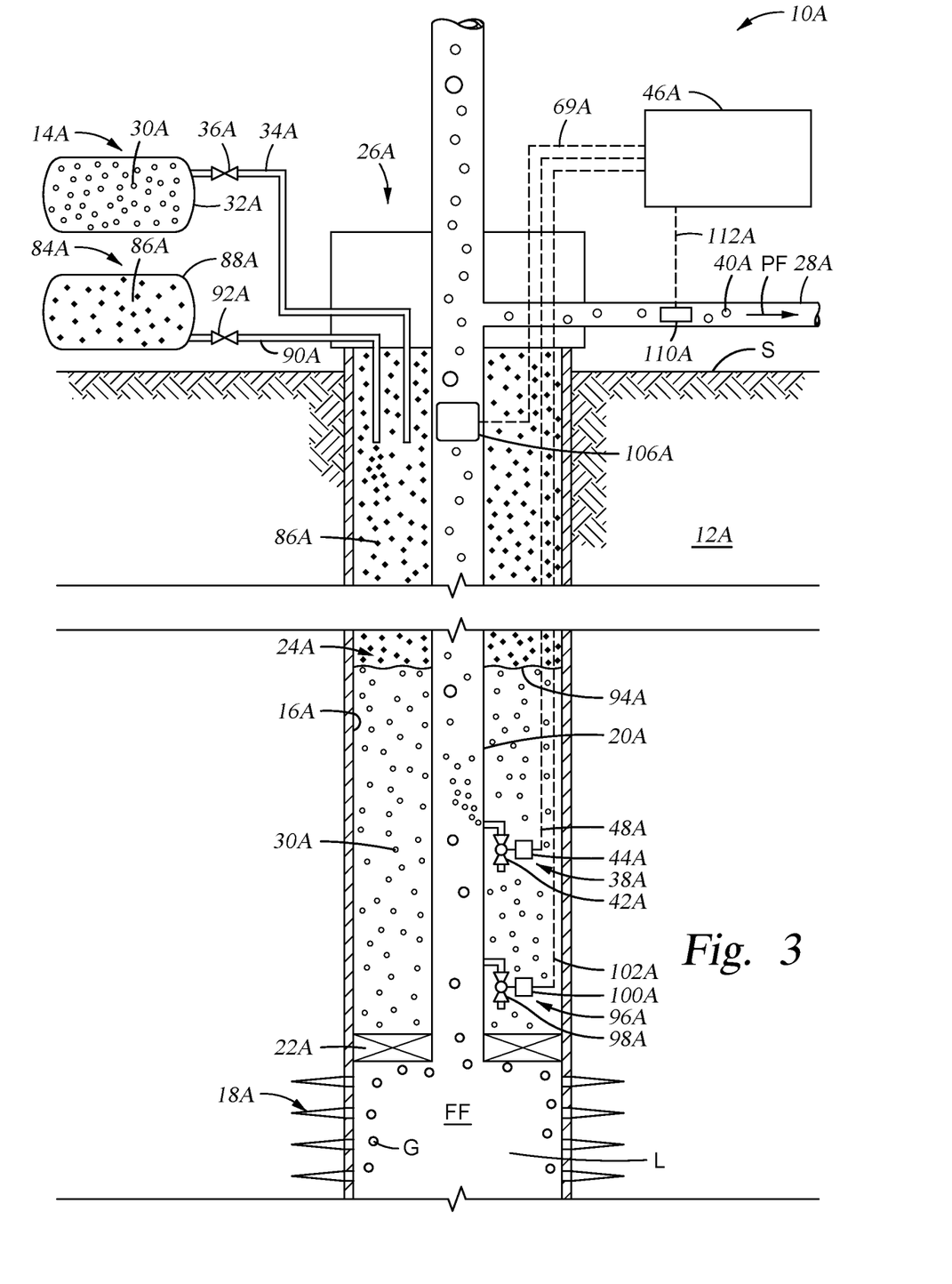
FIG. 3 is a side sectional view of an example of introducing a tracer gas into an annulus of a well that is assisted by lift gas injection.

An alternate example of a well system 10A is shown in side sectional view in FIG. 3 and which like the well system 10 of FIG. 1 includes a lift gas system 14A with lift gas 30 from a lift gas source 30A introduced into the well 16A through line 34A. Valve 36A provides selective regulation of lift gas 30A into the well 16A. In the example of FIG. 3, a tracer gas injection system 84 is included and which selectively introduces an amount of tracer gas 86A into the production tubing 20A. Included with the tracer gas injection system is a tracer gas source 88A and a tracer gas line 90A having one end connected to source 88A and a discharge end disposed in the annulus 24A. Valve 92A regulates the introduction of the tracer gas 86A into annulus 24A. Here, the tracer gas 86A being introduced into annulus 24A is shown urging the lift gas 30A downward within annulus 24A; an interface 94A is defined that represents a border between the tracer gas 86A and lift gas 30A, and which is shown extending perpendicularly within annulus 24A. During this time, the bubbles 40A of injection gas 30A are being introduced into the production tubing 20A and assisting lifting of fluids from within well 16A. Alternatively tracer gas 86A is added into the annulus 24A with the lift gas 30A and flows in the annulus 24A and inside the production tubing 20A combined with the lift gas 30A. In an embodiment tracer gas source 88A is a bottle (not shown) on surface, and an example amount of tracer gas 86A contained in bottle is around 20 pounds. In an example, a time of when tracer gas 86A is introduced into the tubing 20A is calculated based on the flow rates of fluid (i.e. lift gas 30A, tracer gas 86A, a combination of lift gas 30A and tracer gas 86A) flowing downward inside the annulus 24A from surface. It is within the capabilities of one skilled to estimate the travel time of the fluid flowing downward in the annulus 24A.

Figure 4:
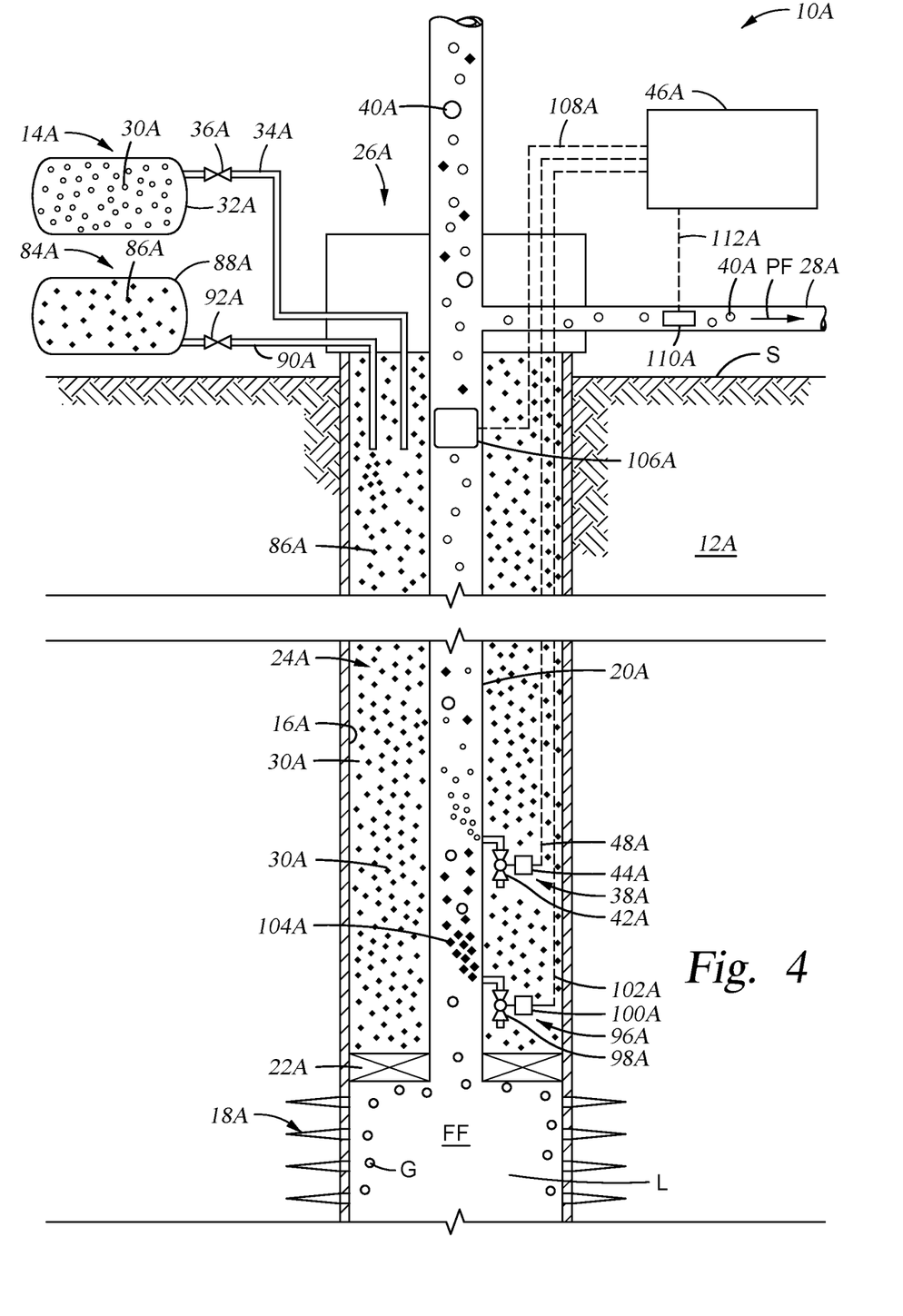
FIG. 4 is a side sectional view of an example of injecting the tracer gas from the annulus into production tubing in the well of FIG. 3.
Figure 5:
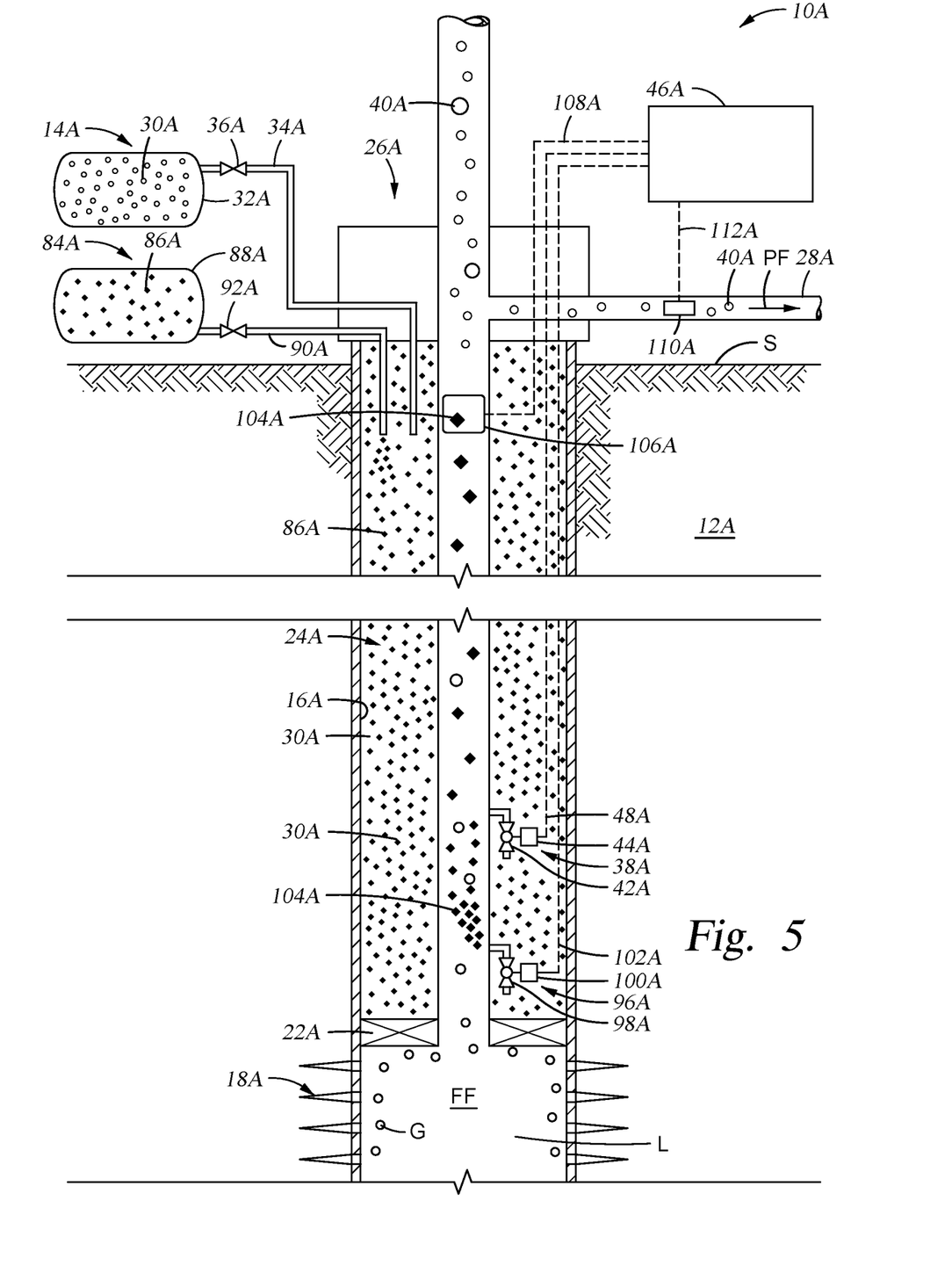
FIG. 5 is a side sectional view of the well of FIGS. 3 and 4 at a period of time after the tracer gas was injected into the production tubing.

Referring now to FIG. 4, shown in side sectional view is that the tracer gas 86A is continued to be introduced into the annulus 24A and has purged substantially all of the lift gas 30A from within annulus 24A, through the injection module 38A, and to inside of production tubing 20A. Referring back to FIG. 3, included with the tracer gas injection system is a tracer gas injection module 96A which includes a valve 98A and operable with an attached actuator 100A which receives command signals from controller 46A via communication line 102A. Similar to the injection module 38A, selective opening and closing of valve 98A provides communication between annulus 24A and inside of production tubing 20A. Referring back to FIG. 4, a command from controller 46A selectively opens the valve 98A of module 96A so that a bubble 104A of tracer gas 86A is introduced into the production tubing 20A. As shown in FIG. 5 bubble 104A moves upward in the production string 20A with the flow stream of produced fluid PF, and after a period of time the bubble 104A of tracer gas is adjacent a sensor 106A that is responsive to a characteristic of the tracer gas 86A. In one example, the tracer gas 86A includes an amount of carbon dioxide, and the presence of which is that detectable by sensor 106A. Alternatively, substances for use in tracer gas 86A and tracer liquid 50 are obtainable from Tracerco, 5th Floor, 25 Farringdon Street, London EC4A 4AB and from Resmetrics, Houston, Tex. (832) 592 1900. A communication link 108A provides communication between sensor 106A and controller 46A. A second flow tracer gas sensor 110A is shown downstream of sensor 106A and within production line 28A, which is also responsive to presence of the tracer gas 86A. In one example, results from monitoring travel of bubbles 104A of tracer gas 86A within production tubing 20A provide information about the slip factor of the produced fluid PF flowing within production tubing 20A. Similar to the example of FIG. 2, in an embodiment travel time of tracer gas 86A between injection module 96A and sensor 106A is monitored, and along with a distance $L_1$ between injection module 96A and sensor 106A, and estimate of velocity of tracer gas 86A in production tubing 20A is estimated for estimating slip factor.

Figure 6:
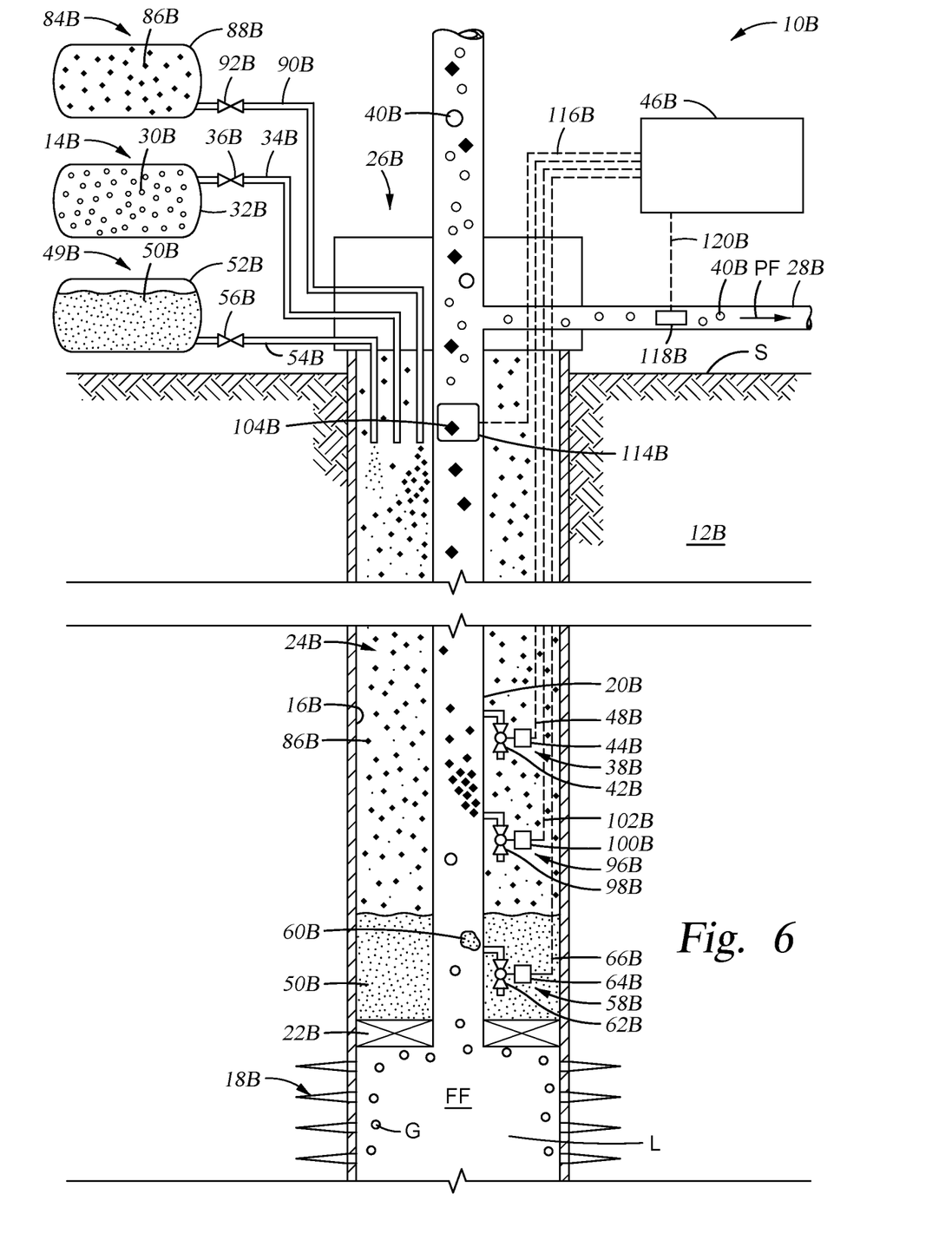
FIG. 6 is a side sectional view of an example of injecting a tracer liquid and a tracer gas into a well assisted by lift gas injection.

Shown in a side partial sectional view in FIG. 6 is another embodiment of a well system 10B, and which includes both a tracer liquid injection system 49B and a tracer gas injection system 84B. In the example of FIG. 6, annulus 24B is filled with the tracer gas 86B and the lift gas bubbles 40B are illustrated as being downstream of bubbles 104B of the tracer gas 86B inside production tubing 20B. With the inclusion of both the tracer liquid and tracer gas injection systems 49B, 84B, injection modules for lift gas, tracer liquid, and tracer gas (38B, 58B, 96B) are mounted onto the outer side walls of production tubing 20B. Similar to the embodiments of FIGS. 1 and 2, the tracer liquid injection module 58B is submerged within the tracer liquid 30B that has collected within a lower end of annulus 24B. Further illustrated are the simultaneous introduction of a tracer liquid assemblage 60B and a tracer gas bubble 104B into the stream of produced fluid PF flowing within the production string 20B. Further in this example, is a tracer sensor 114B within production tubing 20B that selectively senses the presence of one or both the bubble 104B of tracer gas 86B and the tracer liquid assemblage 60B. Alternatively, tracer sensor 114B is on surface. Communication link 116B provides communication of output from sensor 114B to controller 46B. In one non-limiting example of operation, the lift gas 30B within annulus 24B is replaced with the tracer gas 86B, and tracer liquid 30B introduced into the annulus 24B collects at the lower end of annulus 24B and on packer 22B. Modules 58B, 96B are actuated to selectively introduce the tracer liquid assemblage 60B and tracer gas bubbles 104B into the stream of produced fluid PF. In an alternate example, tracer gas bubbles 104B include lift gas 30B and tracer gas 86B. The time required to travel the distances L, $L_1$ between the points of injection and the sensor 114B are recorded and a velocities for each of the tracer gas 86B and tracer liquid 50B are estimated in a manner as described above. Based upon these respective velocities, a slip factor for gas and liquid within the produced fluid PF is estimated.

Figure 7:
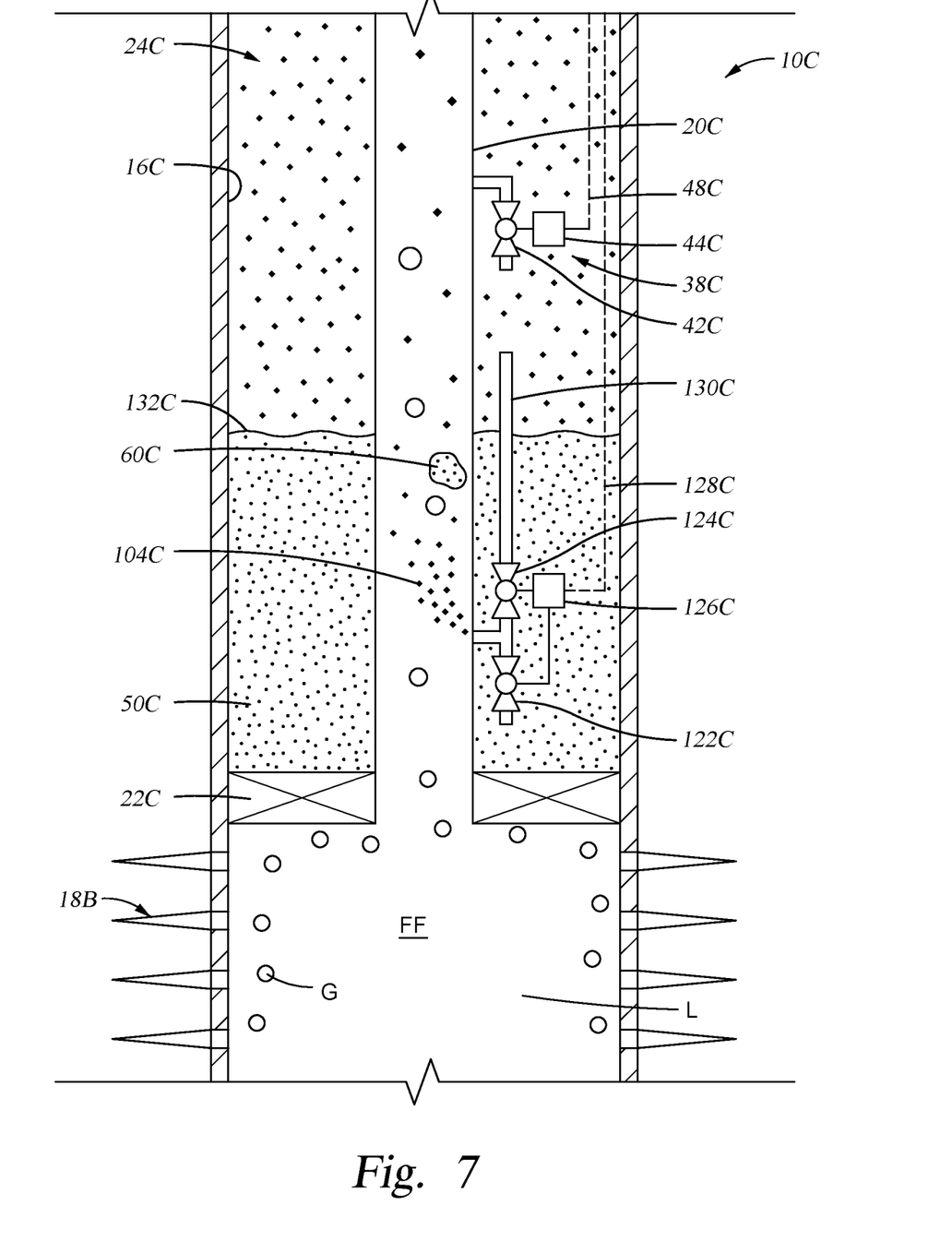
FIG. 7 is a side sectional view of an enlarged portion of the well of FIG. 6, and having an alternate example of a module for injecting tracer liquid and tracer gas.

Referring now to FIG. 7, shown in a side sectional view is a portion of an alternate embodiment of well system 10C. In this example, tracer liquid 50C and tracer gas 86C are introduced into production tubing 22C through a single tracer injection module 120. Included with module 120C is an alternate embodiment of the tracer liquid injection valve 122C shown with an inlet submerged within the tracer liquid 50C, which when opened provides communication between tracer liquid 50C in annulus 24C and inside of production tubing 20C. An alternate embodiment of the tracer gas injection valve 124C is also included with module 120C, and is selectively opened to allow communication of the tracer gas 86C within annulus 24C into production tubing 22C. A passage for the flow of tracer liquid 50C through module 120C flows through valve 122C; and similarly a passage for the flow of tracer gas 86C extends through valve 124C. In the example illustrated, a common actuator 126C provides the motive force for orienting either of valves 122C, 124C into the open or closed configuration and to allow the introduction of the tracer liquid 50C or tracer gas 86C into production tubing 22C. A communication line 128C, in one alternative, provides communication from controller 46C to energize the actuator 126C. Further shown is a snorkel 130C connected to an end of valve 124C, in the example shown snorkel 130C is a tubular member that has an end opposite its connection to valve 124C disposed in a portion of annulus 24C above an interface 132C is between the tracer gas 86C and tracer liquid 50C. Strategic dimensioning of the snorkel 130C allows for injection of tracer gas 86C and tracer liquid 50C into the production tubing 22C at substantially the same location along an axis Ax of the tubing 22C. An advantage of implementing the integrated injection module 120C is the reduction of parts and also the introduction of the tracer fluids at a single location on the production tubing 22C.

In a non-limiting example of operation, a flow regime of the produced fluid PF flowing within the production fluid 20B is identified based on the estimated slip factor value. Alternatively, identification of the flow regime of the produced fluid PF is also based on flow rates of the liquid and gas estimated above. Further optionally, operation of the well system 10 is adjusted to alter the stream of produced flow PF from a particular flow regime to another flow regime. Examples of flow regimes include slug flow, churn flow, wavy flow, bubble flow, annular flow, and combinations. Examples of adjusting well system 10 operation include changing flow rate of lift gas 30 injection, changing flow rate of tracer gas 86 injection, controlling a flow rate of the production fluid PF flowing in the production line, and adjusting a pressure inside the production string 20. In an alternative embodiment, well system 10, 10A-C (FIGS. 1-7) includes more than one lift gas module 38, 38A, 38B and/or more than one tracer gas injection module 96A, 96B, and which are disposed at different depths along the production tubing 20, 20A, 20B, 20C. Providing modules 38, 38A, 38B, 96A, 96B at different depths provides the option of changing the depth(s) at which lift gas 30 and/or tracer gas 86 is introduced into the production tubing 20, 20A, 20B, 20C, in one alternative flow regime(s) inside the production tubing 20, 20A, 20B, 20C are adjusted by selectively introducing lift gas 30 and/or tracer gas 86 into the producing tubing 20, 20A, 20B, 20C. In an embodiment, lift gas 30 and/or tracer gas 86 is selectively introduced into the production tubing 20, 20A, 20B, 20C at designated depths to adjust a flow regime of fluid flowing upward inside the production tubing 20, 20A, 20B, 20C at the designated depth. As discussed in more detail below, certain flow regimes are desired while others are not; and identification of a downhole flow regime can be identified and wellbore parameters adjusted to adjust and alter the flow regime of the produced fluid PF and production tubing 20.

Figure 8:
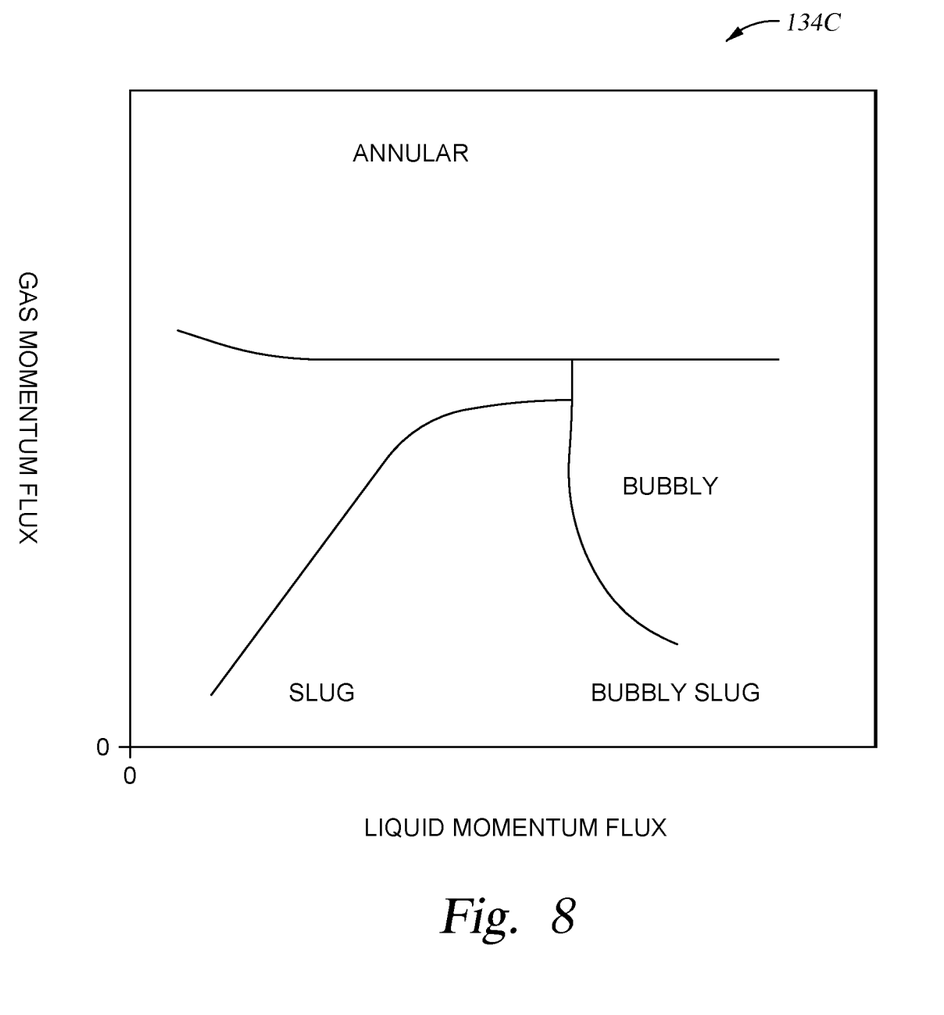
FIG. 8 is a flow regime map of two-phase flow.

A flow regime map 134C is graphically depicted in FIG. 8, based on a vertical flow regime map; which is attributable to Hewitt and Roberts (1969) for flow in a 3.2 cm diameter tube and found at https://authors.library.caltech.edu/25021/1/chap7.pdf. Map 134C provides an exemplary illustration that with changing momentum flux of liquid or gas within a two-phase mixture, the regime of a two-phase flow is altered. For example, illustrated in the map 134C is by increasing an amount gas in a two-phase flow that is presently operating in a region of the map 134C identifying a flow regime that is slug or bubbly gas slug, the flow regime of the two-phase flow is adjusted into an annular flow. One non-limiting step of operation of the method described herein calculating a slip factor based on monitoring a velocity of a tracer liquid, a tracer gas or both, identifying a flow regime of the produced fluid PF in the production tubing 20 (FIG. 1), and adjusting a parameter of well operation to alter a flow regime of the two-phase flow of the produced fluid PF to a different flow regime.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. Alternatively, the flow of tracer gas 86 and tracer liquid 50 upwards inside the production tubing 28 are tracked simultaneously or at different times. These and other similar modifications will readily suggest themselves to those skilled in the art, and are intended to be encompassed within the spirit of the present invention disclosed herein and the scope of the appended claims.

What is claimed is:

1. A method of operating a well comprising:
   a. injecting lift gas into a stream of production fluid flowing through a string of production tubing disposed inside the well;
   b. adding a tracer liquid into the stream at a first location by introducing amounts of the tracer liquid into an annulus that circumscribes the production tubing, and opening a liquid passage in a tracer liquid injection module to selectively inject the tracer liquid into the production tubing so that the tracer liquid flows downstream with the production fluid;
   c. adding a tracer gas into the stream at a second location by introducing amounts of the tracer gas into the annulus, and opening a gas passage in the tracer gas injection module to selectively inject the tracer gas into the production tubing so that the tracer gas flows downstream with the production fluid;
   d. sensing the presence of the tracer liquid in the stream at a third location that is downstream of the first location;
   e. sensing the presence of the tracer gas in the stream at a fourth location that is downstream of the second location;
   f. estimating a velocity of the tracer liquid flowing in the stream based on a time span between adding and sensing the tracer liquid and a distance between the first and third locations;
   g. estimating a velocity of the tracer gas flowing in the stream based on a time span between adding and sensing the tracer gas and a distance between the second and fourth locations;
   h. obtaining an estimated slip factor of a liquid and a gas flowing in the production stream that is based on estimated velocities of tracer liquid and tracer gas;
   i. identifying a characteristic of the stream of production fluid based on the estimated slip factor; and
   j. adjusting the characteristic of the stream of production fluid by selectively injecting additional lift gas into the stream at a depth different from step (a).

2. The method of claim 1, wherein the characteristic of the stream of production fluid comprises a flow regime.

3. The method of claim 2, wherein altering the flow regime further comprises adjusting an amount of gas being injected into the stream of production fluid.

4. The method of claim 1, wherein the production stream flows through a string of production tubing inside the well, and wherein injecting the tracer liquid comprises collecting an amount of the tracer liquid in an annulus that circumscribes the production tubing and adjacent a tracer liquid injection module, and selectively opening a valve in the tracer liquid injection module to provide communication between the annulus and inside of the production tubing.

5. The method of claim 1, wherein the production stream flows through a string of production tubing inside the well, and wherein injecting the tracer gas comprises injecting the tracer gas into an annulus that circumscribes the production tubing and adjacent a tracer gas injection module, and selectively opening a valve in the tracer gas injection module to provide communication between the annulus and inside of the production tubing.

6. The method of claim 1, wherein the step of adding the tracer liquid comprises introducing a selected amount of the tracer liquid to form a tracer liquid assemblage in the stream.

7. The method of claim 1, wherein the tracer injection module comprises a snorkel that is in the annulus and has an opening that is above an interface between tracer gas and tracer liquid in the annulus, and wherein the snorkel comprises a pathway for the tracer gas to flow to the first passage.

8. The method of claim 1, wherein the stream flows uphole in the well inside a string of production tubing, and wherein the first and second locations are proximate a lower end of the production tubing, and wherein the third and fourth locations are proximate a wellhead assembly that is mounted over an opening of the well and on surface.

9. A method of wellbore operations comprising:
adding lift gas to a stream of production fluid that is flowing uphole inside of a string of production tubing disposed in the wellbore;
adding a viscous tracer liquid into the stream through a tracer liquid passage that intersects a tracer injection module and is in communication with a liquid injection port disposed on a lower end of the production string so that the tracer liquid forms a tracer liquid assemblage that remains cohesive and flows with the production fluid uphole, the tracer injection module comprising a snorkel tube that extends from a body of the module past an interface between the tracer gas and tracer liquid in an annulus that circumscribes the production tubing;
obtaining a velocity of the tracer liquid by sensing for the presence of the tracer liquid at a location uphole and spaced away from the liquid injection port;
adding a tracer gas into the stream through a tracer gas passage that is formed in the tracer injection module and is separate from the tracer liquid passage;
obtaining a velocity of the tracer gas in the stream by sensing for the tracer gas at a location spaced away from the tracer gas injection point; and
estimating a slip factor between gas and liquid in the production fluid based on the velocity of the tracer liquid and tracer gas.

10. The method of claim 9, further comprising identifying a flow regime of the production produced fluid flowing in the production string.

11. The method of claim 10, further comprising altering the flow regime of the produced fluid flowing in the production string by an operation selected from the group consisting of adjusting an amount of lift gas added to the stream, adjusting a depth where the lift gas is added to the stream, and combinations thereof.

12. A system for producing fluids from within a wellbore comprising:
production tubing disposed in the wellbore and defining an annulus between the production tubing and sidewalls of the wellbore;
a lift gas system having a source of lift gas and a lift gas line with a discharge end in the annulus that is in selective communication with the source of lift gas;
a tracer injection module coupled with the production tubing and that comprises a tracer liquid passage that is selectively changeable between open and closed configurations, a tracer gas passage that is selectively changeable between open and closed configurations, and a snorkel that is in communication with the tracer gas passage;
a tracer liquid system having a source of tracer liquid and a tracer liquid line with a discharge end in the annulus that is in selective communication with the source of tracer liquid;
a tracer gas system having a source of tracer gas and a tracer gas line with a discharge end in the annulus that is in selective communication with the source of tracer gas; and
an amount of tracer liquid in the annulus, an amount of tracer gas in the annulus, an interface between the tracer liquid in the annulus and the tracer gas in the annulus that is below an open end of the snorkel.

13. The system of claim 12, further comprising a means for estimating a flowrate of a stream of production produced fluid flowing through the production tubing.

14. The system of claim 12, wherein the tracer gas comprises carbon dioxide.

15. The system of claim 12, wherein a stream of production fluid selectively flows through the production tubing, and in which the tracer liquid and the tracer gas are selectively injected into through the tracer injection module and are carried uphole and sensed by a sensor in communication with the production tubing that is spaced away from the tracer injection module and responsive to the presence of the tracer liquid, the tracer gas, or both.

* * * * *